United States Patent Office
3,580,716
Patented May 25, 1971

3,580,716
METHOD FOR PLANT GROWTH REGULATION
Dorsey R. Mussell, Clare, and Richard A. Schwartzbeck, Midland, Mich., assignors to The Dow Chemical Company, Midland, Mich.
No Drawing. Filed Apr. 10, 1968, Ser. No. 720,393
Int. Cl. A01n 5/00, 9/20
U.S. Cl. 71—76
4 Claims

ABSTRACT OF THE DISCLOSURE

Disclosed is a method involving the exposure of plants and plant parts to a growth regulating amount of tetraisopentylammonium bromide or tetraisopentylammonium chloride, or compositions thereof. Such practice is particularly useful for the regulation of the growth pattern of plant life, particularly as evidenced by the retardation of growth and enhancement of maturation.

BACKGROUND OF THE INVENTION

One active area of agricultural research is devoted to the production of more productive plant life, particularly that plant life usually considered as or associated with food sources or beauty for man. In this research, considerable effort has been expended in developing means which will speed the production and reproduction aspects of plant growth.

These objectives have been accomplished, in part, by the discovery, development, and distribution of various (chemical) agents which alter or modify the growth characteristics of plants. Documentation of such can be found in, for example, Dwarfing Plants With Chemicals. Agricultural Research Service, U.S. Dept. of Agriculture, January 1961.

SUMMARY OF THE INVENTION

The present invention is directed to a method which involves exposing viable plants and plant parts to a growth regulating amount of tetraisopentylammonium bromide or tetraisopentylammonium chloride. This method facilitates early maturation and causes a marked retardation in the growth or stunting of plants of both the broadleaf and narrowleaf species. Additionally, the method provides for plants which are in a good state of health, which are lush and bountiful in color and appearance, and which are of good resistance to plant diseases and attack by plant pests. In addition, the method may be readily carried out to procure these desirable properties without substantial injury to the plants.

Tetraisopentylammonium bromide and tetraisopentylammonium chloride are both crystalline solids, both being readily soluble in water as well as other, organic solvents. It will be understood that the method of the present invention embraces the use of tetraisopentylammonium bromide and tetraisopentylammonium chloride singly or in combination or mixture with one another.

The exposure of viable plants and plant parts to the action of a growth regulating amount of the halide compounds is essential and critical for the practice of the present invention. The exact dosage to be employed is dependent upon the response desired in the plant as well as such other factors as the plant specie and the stage of growth at which treatment is made, the soil type and the depth at which the compounds are distributed in the soil, and climatic conditions such as temperature, wind and especially rainfall.

DETAILED DESCRIPTION AND PREFERRED EMBODIMENTS

In foliar treatments for the control and inhibition of vegetative growth, good results are obtained when from 0.10 pound to 20 pounds or more, preferably, 2 to 15 pounds of the halide compounds are applied per acre. In applications to soil for the control of the growth of germinant seeds, emerging seedlings and established vegetation, good results are obtained when the halide compounds are distributed in the soil at the above dosage and through such a cross section of the soil as to provide for the presence therein of an effective concentration of the halide compounds. In such applications, it is desirable that the compounds be distributed to a depth of at least 0.25 inch. In general, good results are obtained at dosages of from about 1 part or more, and preferably from 5 to 100 parts or more by weight of active agent per million parts by weight of soil.

The method of the present invention can be practiced by distributing the unmodified halide compounds in growth media or upon the surfaces of the above-ground portion of plants. However, the present method also embraces the similar employment of liquid or dust compositions containing the halide compounds. In such usages, the halide compounds can be modified with one or a plurality of additaments or adjuvants including water or other liquid carriers, surface active dispersing agents, and finely divided solids. Depending upon the concentration of halide compound, such augmented compositions are adapted to be distributed in soil or upon the above ground surfaces of plants, or to be employed as concentrates and subsequently diluted with additional inert carrier to produce the ultimate treating compositions. In compositions where the adjuvant or helper is a finely divided solid, a surface active agent or the combination of a surface active agent and a finely divided solid, and/or a liquid additament, the adjuvant and/or adjuvants cooperate with the halide compounds so as to facilitate the invention and obtain an improved and outstanding result.

The exact concentration of the halide compounds to be employed in the treating compositions is not critical and may vary considerably provided the required dosage of the halide compounds is supplied in the growth medium or upon the plant foliage. The concentration of halide compound in liquid compositions employed to supply the desired dosage generally is from about 0.001 to 50 percent by weight although concentrations as low as 0.0001 percent and as high as 90 percent by weight are sometimes advantageously employed. In dusts, the concentration of toxicant is from about 0.1 to 90 percent by weight and usually not in excess of about 20 percent. In both liquid and dust compositions to be employed as concentrates, the halide compounds can be present in a concentration of from 5 to 98 percent by weight.

The quantity of treating compositions to be applied can vary considerably provided that the required dosage of halide compound or active ingredient is applied in a sufficient amount of the finished composition to cover adequately the vegetation to be treated or to facilitate the penetration and distribution of said ingredient in growth media. The required amount of the active ingredient in the soil conveniently can be supplied per acre treated in from 10 to 27,000 gallons or more of the liquid carrier or in from 50 to 2,000 pounds of the solid carrier. In the treatment of seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above-ground portion of the vegetation. In the application of dusts to plant foliage, good results are obtained with from 40 to 2,000 pounds of finished dust per acre, the only requirement being that the required toxicant dosage be supplied in sufficient dust to achieve good coverage of the foliage.

Liquid compositions containing the desired amount of active ingredient can be prepared by dispersing the halide compounds in water or in organic liquid, with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, and naphthas. The organic liquid compositions can contain a small amount of water as a solvent for the active ingredient. In such compositions, the carrier comprises an emulsion, namely, a mixture of water, emulsifying agent and organic liquid. In the liquid compositions, the choice of dispersing and emulsifying agent and the amount thereof employed is dictated by the nature of the composition and by the ability of the agent to facilitate the dispersion of the halide compounds in the carrier to produce the desired composition or to facilitate the wetting of surfaces upon which the compositions are applied. Dispersing and emulsifying agents which can be employed in the compositions include the condensation products of alkylene oxides with phenols and organic acids, alkyl aryl sulfonates, polyoxyalkylene derivatives of sorbitan esters, complex ether alcohols, mahogany soaps and the like.

In the preparation of dust compositions, the active ingredient is dispersed in and on a finely divided solid such as clay, talc, chalk, gypsum, sugar, salt, bicarbonate, fertilizer and the like. In such operations, the finely divided carrier is mechanically mixed or ground with the halide compounds. Similarly, dust compositions containing the halide compounds can be prepared from various of the solid surface active dispersing agents such as bentonite, fuller's earth, attapulgite and other clays. Depending upon the proportion of ingredients, these dust compositions can be employed as concentrates and subsequently diluted with additional solid surface active dispersing agent or with chalk, talc or gypsum, sugar, salt, fertilizer, and the like to obtain the desired amount of active ingredient in a composition adapted to be employed for the modification of the growth of plants. Also such dust compositions can be dispersed in water with or without the aid of a dispersing agent to form spray mixtures.

When operating in accordance with the present invention, growth regulating amounts of the halide compounds are dispersed in soil or growth media in any convenient fashion. Applications to growth media can be carried out by simply mixing with the media, by applying to the surface of soil and thereafter dragging or discing into the soil to the desired depth or by employing a liquid carrier to accomplish the penetration and impregnation. The application of spray and dust compositions to the surface of soil or to the above-ground surfaces of plants can be carried out by conventional methods, e.g., power dusters, boom and hand sprayers and spray dusters.

In a further method, the distribution of the halide compounds in soil can be accomplished by introducing the agents in the water employed to irrigate the soil. In such procedures, the amount of water can be varied with the porosity and water-holding capacity of the soil to obtain the desired depth of distribution of the toxicants.

The expression "growth media" is employed in the present specification and claims in its broadest sense to be inclusive of all conventional soils and thus refers to any substance or media in which vegetation may take root and grow, and is intended to include not only earth but compost, manure, muck, sumus, and sand and the like, adapted to support plant growth.

The expression "surface active dispersing agent" as herein employed is intended to include all agents which are capable of acting at the interfacial surface as the dispersion medium. Thus, the term is inclusive of the solid emulsifying agents such as finely divided aluminum hydroxide and finely divided bentonite, fuller's earth, attapulgite and other clays, as well as the ionic and non-ionic wetting and emulsifying agents such as the alkaline earth metal caseinates, alkyl aryl sulfonates, sulfonated oils, complex organic ester derivatives, complex ether alcohols, and the like.

The finely divided inert solid or carrier as herein described refers to materials which are incapable of facilitating dispersion but which serve as a distribution medium for the active compounds. They include finely divided materials such as chalk, talc, gypsum, sugar, salt, bicarbonate, fertilizers, and so forth.

The following examples serve to further typify the nature of the present invention and the manner by which it can be practiced. They should not be construed as limitative.

EXAMPLE 1

Tetraisopentylammonium bromide is dissolved in water to prepare an aqueous spray composition containing 0.12 pound of the bromide compound per 100 gallons of composition. This aqueous composition is employed for the treatment of soil and observations are later made to determine what effect is manifested upon the emerging seedlings and subsequent adult plants of various plant species. These species include bean, wheat, soybean, radish, pea and cranberry bean. In these determinations, the composition is employed to treat seed beds of sandy loam soil of good nutrient content which are prepared and seeded with the named plant species. In the treating operations, the compositions are applied as a soil drench at a rate of 0.3 acre inch of aqueous composition per acre to supply a substantially uniform dose of 10 pounds of tetraisopentylammonium bromide per acre. This dosage corresponds to a concentration of about 16 parts by weight per million of soil. Adjacent areas of soil similarly seeded with the named plant species are left untreated to serve as checks.

After three weeks, observations and recordations are made of the height of the plants in the treated and check soils. The results of these observations are set forth in the following Table I:

TABLE I

| Treatment | Height of indicated plant species in inches | | | | | |
|---|---|---|---|---|---|---|
| | Bean | Wheat | Soybean | Radish | Pea | Cranberry bean |
| Tetraisopentylammonium bromide | 4 | 11 | 5 | 3 | 1 | 9 |
| Check (untreated) | 11 | 12.5 | 10 | 4 | 8 | 12.5 |

In addition, it is observed that the treated plants exhibit an overall sturdier and healthier growth with rapid maturation when compared to the untreated plants of the check area.

EXAMPLE 2

An aqueous composition containing 0.06 pound of tetraisopentylammonium bromide per 100 gallons is prepared by dissolving the compound in water. This composition is applied to seed beds of sandy loam soil of good nutrient content planted with cranberry bean seed. The application is made as a soil drench and at the rate of 0.3 acre inch of aqueous composition per acre to supply a substantially uniform dose of 5 pounds of tetraisopentylammonium bromide per acre. This dosage corresponds to a concentration of about 8 parts by weight of the bromide compound per million parts of soil. To an adjacent seed bed of the same soil planted with the seeds of cranberry bean, the aqueous composition is similarly applied at a dose of 2 pounds of tetraisopentylammonium bromide per acre. This application corresponds to a dosage of 3.2 parts by weight of halide compound per million of soil. An adjacent area also seeded with cranberry bean is left untreated to serve as a check.

After three weeks, the cranberry bean plants in the soil treated with 5 pounds of tetraisopentylammonium bromide per acre are at an average height of 10 inches, those in the soil treated with 2 pounds of tetraisopentylammonium bromide per acre are at an average height of 11 inches, and those in the untreated check sol are at an average height of 12.5 inches.

Further observations show that the cranberry bean plants in the treated soil have good color and are in a healthy growth state not unlike the untreated plants of the check area.

EXAMPLE 3

An aqueous composition containing 0.08 pound of tetraisopentylammonium chloride per 100 gallons is prepared by dissolving the compound in water. This composition is applied to a seed bed of soil of good nutrient content planted with the seeds of cranberry bean, morning glory, wild oat, pea, and wheat. The application is carried out as a soil drench at the rate of 0.44 acre inch of aqueous composition per acre to supply a substantially uniform dose of 10 pounds of tetraisopentylammonium chloride per acre. This dosage corresponds to a concentration of about 11 parts of halide compound per million of soil by weight. To an adjacent area of the same soil also seeded with the named plant species, the aqueous composition is likewise applied at a dosage of 2 pounds of tetraisopentylammonium chloride per acre. This dosage corresponds to a concentration of 4 parts by weight of chloride compounds per million of soil.

A further and adjacent plot of the same soil is also seeded with the named plant species and left untreated to serve as a check. After three weeks, observations and recordations are made of the height of the plants in the treated and untreated (check) soils. The results of those observations are set forth in Table II:

TABLE II

| Treatment | Height of indicated plant species in inches | | | | |
|---|---|---|---|---|---|
| | Cranberry bean | Morning glory | Wild oat | Pea | Wheat |
| Tetraisopentylammonium chloride (2 pounds per acre) | 10 | 6 | 12 | 8.5 | 13 |
| Tetraisopentylammonium chloride (10 pounds per acre) | 10 | 5.5 | 12 | 7 | 11.5 |
| Check (untreated) | 12 | 7 | 15 | 9.5 | 14.7 |

Further observations show that the plants in both the treated and untreated seed beds are robust and of good color and appear in a healthy state of growth.

EXAMPLE 4

Tetraisopentylammonium bromide is dispersed in water to prepare aqueous compositions, one containing 1000 and another 2000 parts per million by weight of the bromide compound. These compositions are separately employed to treat heavy stands of established cranberry bean, morning glory and soybean plants growing rapidly in seed beds of sandy loam soil of good nutrient content. The applications are carried out with conventional spray equipment, the composition being applied to the plants to the point of run off. At the time of the applications the plants are each at an average height of from 1 to 2 inches. Adjacent stands of the same plant species are left untreated to serve as checks.

Four weeks following the applications observations are carried out to determine the average height of the treated and check plants. The results are set forth in Table III:

TABLE III

| Treatment | Height of indicated plant species in inches | | |
|---|---|---|---|
| | Cranberry bean | Morning glory | Soybean |
| Tetraisopentylammonium bromide (2,000 parts per million) | 7 | 4 | 7.5 |
| Tetraisopentylammonium bromide (1,000 parts per million) | 8 | 5 | 6 |
| Check (untreated) | 12.5 | 7 | 9.2 |

EXAMPLE 5

The procedure exactly as described in Example 4 is repeated utilizing tetraisopentylammonium chloride in lieu of tetraisopentylammonium bromide upon the established stands of plant species cranberry bean, cucumber, tame oat, corn, soybean, and wheat with the observed results as follows:

TABLE IV

| Treatment | Height of indicated plant species in inches | | | | | |
|---|---|---|---|---|---|---|
| | Cranberry bean | Cucumber | Tame oat | Corn | Soybean | Wheat |
| Tetraisopentylammonium chloride (1,000 parts per million) | 8 | 3.5 | 6 | 18 | 7 | 10.5 |
| Tetraisopentylammonium chloride (2,000 parts per million) | 7 | 2 | 5 | 17 | 6 | 9 |
| Check (untreated) | 12.5 | 4.5 | 7 | 19 | 9.2 | 11.5 |

EXAMPLE 6

Tetraisopentylammonium bromide is dissolved in water to prepare an aqueous spray composition containing 1000 parts of the bromide compound by weight per million. This composition is applied to a lawn containing a heavy and mixed stand of Kentucky bluegrass, red fescue, and Colonial bentgrass in a vigorous state of growth and at an average height of about 1½ inches. The application is carried out with conventional spray equipment operating at 40 pounds per square inch. In such operations, the composition is applied to the plants to the point of run off to provide 20 pounds of tetraisopentylammonium bromide per acre. An adjacent lawn containing a similar stand is left untreated to serve as a check.

One week following the application, the grass in the treated lawn is observed to be at an average height of about 2 inches. The grass foliage in the treated lawn remains dense and exhibits a greenness not different from the untreated lawn. At the time of the observations, the untreated lawn is at an average height of three inches and is subsequently mowed.

Four weeks following the application, both lawns exhibit good color and robust growth. The treated lawn requires mowing for the first time since the application. During this same period, the untreated lawn requires three mowings.

EXAMPLE 7

25 parts of tetraisopentylammonium bromide and tetraisopentylammonium chloride are separately mechanically mixed and ground each with 62 parts of fuller's earth, 10 parts of diatomaceous earth, 2 parts of an alkyl aryl sulfonate (Naccanol NR), and 1 part of a polymerized sodium salt of a substituted benzoid alkyl sulfonic acid (Daxad No. 27) to prepare two concentrate compositions in the form of wettable powders.

Similarly, 25 parts by weight of these ammonium salts are separately, mechanically mixed each with 65 parts of xylene, and 10 parts of a dimeric alkylated aryl polyether alcohol (Triton X-155), to prepare two liquid emulsifiable concentrate compositions.

In a like manner, 6 parts by weight of these ammonium salts are ballmilled each with 0.1 part of Naccanol NR, 0.1 part of Daxad No. 27 and 200 parts of water to prepare two concentrate compositions in the form of water-dispersible liquids.

These concentrate compositions are dispersed in water to prepare aqueous compositions which have desirable wetting and penetrating properties. The latter aqueous compositions are adapted to be employed to treat soil or other growth media or viable parts of growing plants and thus provide contact thereof with tetraisopentylammonium bromide or tetraisopentylammonium chloride in growth-regulating concentrations.

The active compounds hereof can be prepared by known and well-documented methods. In such methods, isopentylchloride or bromide is reacted with ammonia to produce the triisopentylamine. This amine is further alkylated with isopentylbromide or chloride to provide the corresponding quaternary ammonium salt. The procedures are described by Wagner and Zook, Synthetic Organic Chemistry, John Wiley and Sons, New York, 1953, p. 666 et seq. and the references cited therein which are all herein incorporated by reference thereto.

What is claimed is:
1. The method which comprises contacting viable plants and plant parts with a growth regulating amount of tetraisopentylammonium bromide or tetraisopentylammonium chloride.
2. The method according to claim 1 wherein tetraisopentylammonium bromide is employed.
3. The method according to claim 1 wherein tetraisopentylammonium chloride is employed.
4. The method according to claim 1 wherein the tetraisopentylammonium bromide or tetraisopentylammonium chloride is employed in admixture with an adjuvant which serves as a carrier therefor.

References Cited

McMullan et al., "The Hydrates of the Tetrabutyl and Tetraisoamyl Quaternary Ammonium Salts," Chem. Abs., vol. 56. 11176h (1962).

Marth et al., "Growth Controlling Effects of Some Quaternary Ammonium Compounds on Various Species of Plants," Chem. Abs., vol. 48, 9605i (1954).

Kortum, "The Light Adsorbtion of Tetralkyl Ammonium Salts," Chem. Abs., vol. 32, 4876 (1938).

Hooper et al., "Properties of Electrolytic Solutions XIV, the Dielectric Constant of Some Solutions of Electrolites in Benzene," Chem. Abs., vol. 29, 664[5] (1935).

ELBERT L. ROBERTS, Primary Examiner

C. L. MILLS, Assistant Examiner

U.S. Cl. XR.

71—121